Oct. 7, 1958 H. G. COOPER 2,854,882
SAFE-PASSING VIEWER FOR MOTOR VEHICLES
Filed May 25, 1956 2 Sheets-Sheet 1
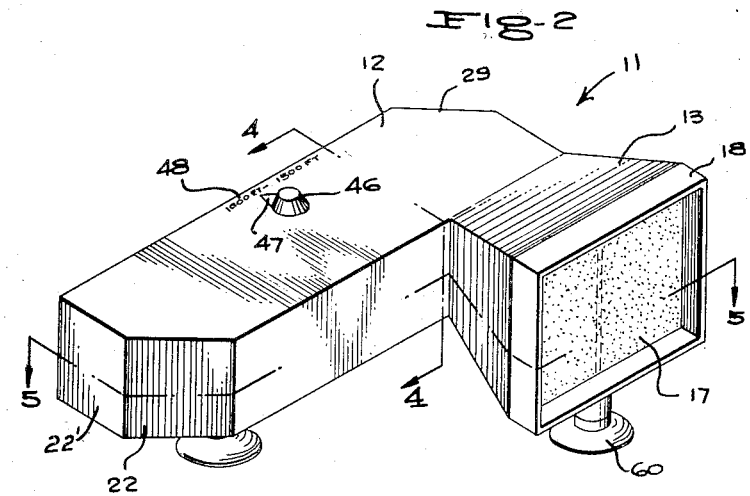
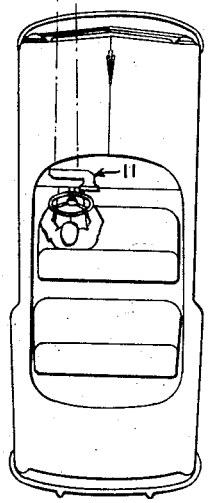
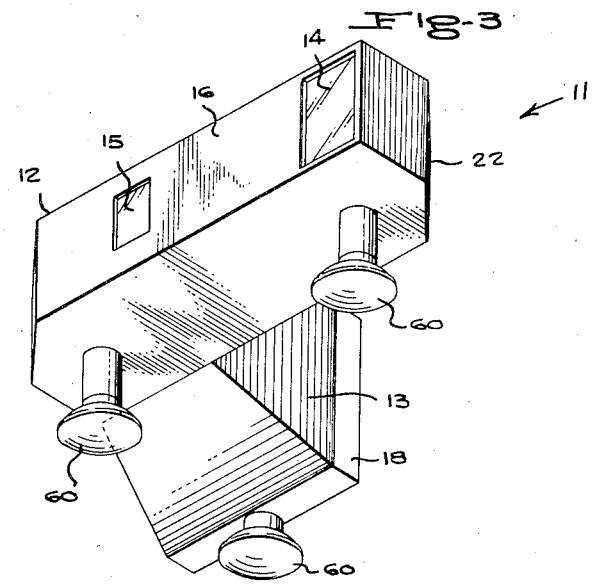
INVENTOR.
HASKELL G. COOPER
BY
*McMorrow, Berman + Davidson*
ATTORNEYS Oct. 7, 1958  H. G. COOPER  2,854,882
SAFE-PASSING VIEWER FOR MOTOR VEHICLES
Filed May 25, 1956  2 Sheets-Sheet 2
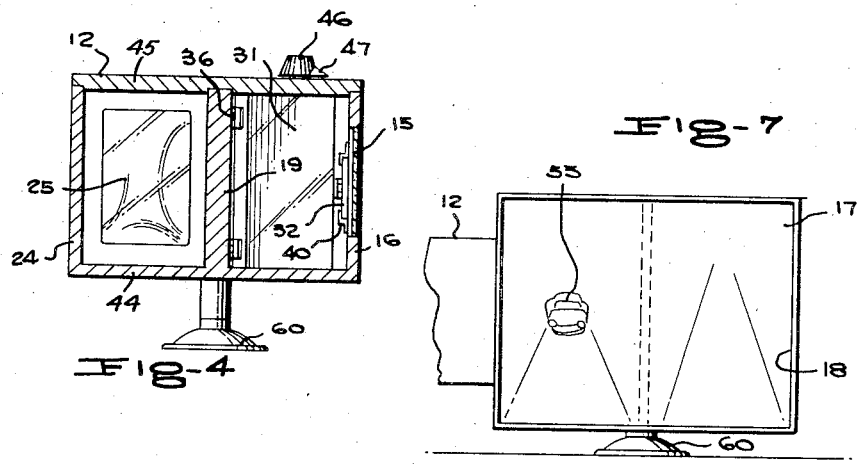
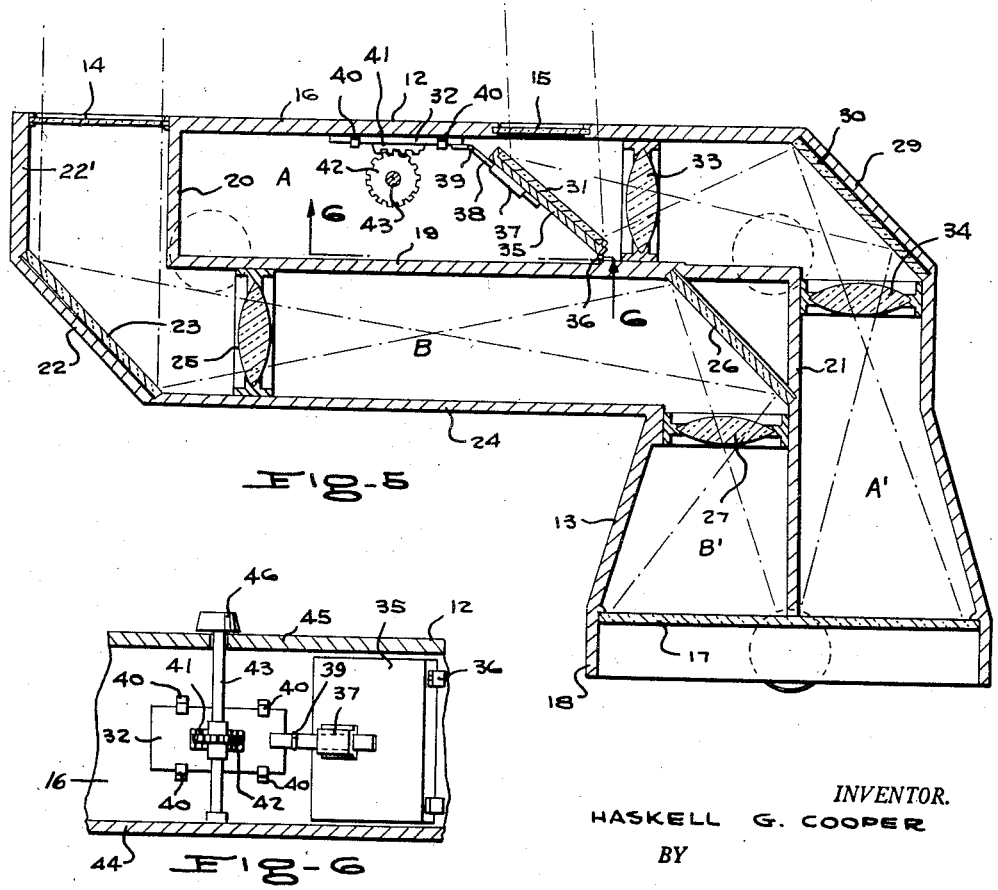
INVENTOR.
HASKELL G. COOPER
BY
ATTORNEYS

United States Patent Office 2,854,882
Patented Oct. 7, 1958

2,854,882

SAFE-PASSING VIEWER FOR MOTOR VEHICLES

Haskell G. Cooper, Watonga, Okla.

Application May 25, 1956, Serial No. 587,269

4 Claims. (Cl. 88—2.7)

This invention relates to an optical distance indicating device for motor vehicles, enabling the driver of a motor vehicle to accurately determine whether the distance between his vehicle and an oncoming vehicle is sufficiently great to enable the driver to safely pass a vehicle ahead of him on his side of the road.

The primary object of the invention is to provide a practical and efficient device of this kind which is compact, is readily mountable on a vehicle, is simple in construction and is composed of a minimum number of simple parts, and which can be made in attractive, rugged, and serviceable forms at relatively low cost.

A further object of the invention is to provide an improved passing clearance indicating device for use on motor vehicles, which is adjustable to set the device to indicate passing distances of differing lengths.

Further objects and advantages of the invention will become apparent from the following description, and the accompanying drawings, wherein:

Figure 1 is a top view of a motor vehicle equipped with a passing clearance indicating device in accordance with the present invention.

Figure 2 is a rear perspective view of the device.

Figure 3 is a front perspective view of the passing clearance indicator of Figure 2.

Figure 4 is an enlarged transverse vertical cross sectional view taken on the line 4—4 of Figure 2.

Figure 5 is an enlarged horizontal cross sectional view taken on the line 5—5 of Figure 2.

Figure 6 is a fragmentary section taken on the line 6—6 of Figure 5; and,

Figure 7 is a fragmentary rear elevational view of the device, showing on its viewing screen the approach of an on-coming vehicle at a distance greater than the minimum safe passing distance for which the device is set, indicating a safe condition for passing.

Referring to the drawings in detail, the illustrated device, generally designated 11, comprises an L-shaped housing comprising a horizontally elongated parallel walled arm 12 extending laterally from and secured at its inward end to the forward end of a forwardly tapered arm 13. The forward wall 16 of the arm 12 has an outer window 14 at its outer end and an inner window 15 in an intermediate part of the forward wall.

Secured in the larger rear end of the housing arm 13 is a ground glass screen 17 which is shielded by a rearwardly extending flange 18 of substantial width, which surrounds the screen 17 and shields the screen from outside light.

The housing arm 12 is longitudinally divided by a vertical longitudinal partition wall 19 into front and rear longitudinal chambers A and B, respectively. The outer end of the front chamber A is closed by a wall 20 located at the inward side of the window 14, as shown in Figure 5. The longitudinal partition wall 19 is connected at its inner end to the forward end of a forwardly extending partition wall 21 in the housing arm 13, which reaches to the screen 17 and divides the arm 13 into two transverse chambers A' and B'.

Housing 12 is formed with a beveled corner 22 on which is mounted an inclined mirror 23, said mirror being at an angle of approximately 45° to the length of housing arm 12 and is arranged to reflect light rays from the window 14 inwardly through the chamber 13. A similarly angled mirror 26 is mounted in the inward end of the chamber B, defined by the walls 19 and 21, and is arranged to reflect light rays from the chamber B through the chamber B' to the screen 17. A first double convex lens 25 is mounted across the chamber B inwardly of the mirror 23. A second double convex lens 27 is mounted across the chamber B' between the mirror 26 and the screen 17. Light rays from an object spaced forwardly from the device enter the window 14, are reflected by the mirror 23, through the lens 25, are reflected from the mirror 26, through the lens 27 and impinged upon to the screen 17. The lenses 25 and 27 are arranged to define a conjugate optical system whereby parallel rays from an image entering the window 14 will be focused on the left hand field of the screen 17 from the chamber B', thus producing an erect image on the screen 17 of an oncoming vehicle.

At the juncture of the inner end of the housing arm 12 with the housing arm 13, the housing has an inclined wall portion 29 on the inside surface of which is mounted a mirror 30 which is disposed at an angle of forth-five degrees to the length of the housing arm 12 at the inner end of the chamber A, so as to reflect light rays, through the chamber A' onto the right hand field of the viewing screen 17 through a double convex line 34 which is mounted across the forward end of the chamber A'. Another double convex line 33 is mounted across the chamber A near the inward end of the chamber A and is outwardly spaced from the mirror 30.

A longitudinal slide 32 mounted on the rear side of the front wall 16 of the housing at a point between the end wall 20 and the window 15, has on its inward end an angled bracket 38. As shown in Figure 5, the mirror unit 31 is mounted in a frame 35 which is hinged at 36 to the partition wall 19, to allow the angle of the mirror 31, which faces the window 15 to be adjusted into and out of parallelism with respect to the mirror 30. The frame 35 has secured to its rear surface a sleeve 37 which slidably receives the bracket 38 which is hingedly connected at 39 to the slide 32. The slide 32 is slidably confined between opposed pairs of hook lugs 40 secured to the front wall 16 of the housing. Secured along the slide 32 is a rack 41 with which is engaged by a pinion 42 secured on a vertical shaft 43 journaled at its lower end in the bottom wall 44 of the housing and extending rotatably through the top wall 45 of said housing. An adjusting knob 46 is provided on the top end of shaft 43, and has a pointer 27 directed to and movable along a distance indicating scale 48 on the top surface of the housing, as shown in Figure 2, whereby the angle of the mirror 31 can be accurately adjusted to positions which provide for corresponding images on both the left and right hand fields of the screen 17.

The device 11 is mounted on any suitable left hand portion of a vehicle within easy view of the driver of the vehicle and facing forwardly so as to receive light rays from objects forwardly of the vehicle, as shown in Figure 1. The light rays from an object located at a point 47 forwardly of the vehicle will reach the windows 14 and 15 along divergent paths 50 and 51 as shown in Figure 1, the rays along the path 50 entering the window 14 and providing an image on the left hand field of screen 17, and the rays 51 entering the window 15 providing an image on the right hand field of the screen 17 when the object is either at the point 47 or closer to the vehicle than said point 47. When the operator of the vehicle sees an image of an oncoming vehicle 55 on the viewing screen 17 in the left hand field only, as shown in Figure 7, said vehicle will be shown to be further ahead than at the point 47. When an image of the oncoming vehicle appears on the right hand field of the viewing screen, the operator is warned that the oncoming vehicle is at the safety limit point 47 or closer than said point 47 and that there is insufficient distance for safe passing.

By rotating of the knob 46 in either direction, the device may be set to provide the double images on the screen 17 at a desired predetermined forward distance from the device. For example, the device may be set to provide a double image on screen 17 when the oncoming vehicle is 1000 ft. ahead of the device. Alternatively, by rotating the knob 46, the device may be set to provide double images when an oncoming vehicle is at some greater distance forwardly of the device, for example, 1500 ft.

As shown in Figures 2 and 3, the housing 12 is provided with suitable means for mounting of the same on a selected portion of the vehicle, for example, to the top surface of the vehicle instrument panel, the underside of the housing being provided with suction cups 60 for this purpose. Obviously, any other suitable mounting means may be provided to secure the device in place.

While a specific embodiment of the invention has been shown and described herein, it will be understood that various modifications within the spirit of the invention may occur to those skilled in the art. Therefore, it is intended that no limitations be placed on the scope of the invention except as defined by the appended claims.

What is claimed is:

1. A forward passing distance indicator device for a vehicle comprising an L-shaped hollow housing having an elongated arm adapted to extend transversely of a vehicle on which the device is mounted, said arm having outer and inner ends, a transverse arm on the inner end of said elongated arm and extending rearwardly therefrom, said arms opening into each other and said transverse arm having a rear end, a translucent viewing screen secured in the rear end of the transverse arm, a longitudinal partition arm in said elongated arm and dividing said elongated arm into front and rear longitudinal chambers, a closure wall inwardly spaced from the outer end of the elongated arm and closing the outer end of the front chamber, the corresponding end of the rear chamber being open, said elongated arm having a front wall and an outer end wall, said outer end wall being outwardly spaced from said closure wall, the outer end portion of the rear chamber extending to said first wall and being between said outer end wall and said closure wall, an outer window in said front wall in the space between said closure wall and said outer end wall, a mirror in said portion of the rear chamber angled to reflect light from said outer window inwardly along said rear chamber, a double convex lens mounted across the outer end of said rear chamber through which said mirror reflects light rays inwardly along the rear chamber, said longitudinal partition wall having an inward end, a transverse wall in said transverse housing arm dividing said transverse arm into left and right hand chambers severally communicating with the inner ends of the rear and front chambers, another mirror at the inner end of the rear chamber angled like the first mentioned mirror to reflect light rays from the first mentioned lens through said left hand chamber toward said screen, another double convex lens mounted across said left hand chamber between said other mirror and said screen, said elongated arm having an inner wall, a further mirror on said inner wall facing the inner end of said front chamber and the forward end said right hand chamber, said further mirror being angled to reflect light rays from said front chamber rearwardly through said right hand chamber toward said screen, a further double convex lens mounted across the forward end of said right hand chamber, a final double convex lens mounted across said front chamber at the inner end thereof and facing said further mirror, said housing front wall having therein an inner window located between and spaced from said closure wall and said final lens, and a final mirror mounted across said front chamber and facing said inner window and said final lens, said final mirror being angled to reflect light rays from said inner window through said final lens.

2. A device according to claim 1 wherein adjustable mounting means on said final mirror is provided on said elongated arm and connected to said final mirror for adjusting said final mirror into and out of parallelism with said further mirror.

3. A device according to claim 2 wherein adjustable mounting means on said final mirror is provided on said elongated arm and connected to said final mirror for adjusting said final mirror into and out of parallelism with said further mirror, said adjustable mounting means comprising a slide mounted on the housing front wall for longitudinal endwise movements, said final mirror having a rear edge hinged to said longitudinal partition wall and a forward edge, a slide bracket slidably secured to said mirror and hinged to one end of said slide, new rack and pinion means acting between said slide and said housing for imparting endwise movement to said slide.

4. A device according to claim 2 wherein adjustable mounting means on said final mirror is provided on said elongated arm and connected to said final mirror for adjusting said final mirror into and out of parallelism with said further mirror, said adjustable mounting means comprising a slide mounted on the housing front wall for longitudinal endwise movements, said final mirror having a rear edge hinged to said longitudinal partition wall and a forward edge, a slide bracket slidably secured to said mirror and hinged to one end of said slide, new rack and pinion means acting between said slide and said housing for imparting endwise movement to said slide, and manual means on said housing and operatively connected to said rack and pinion means, said manual means comprising a rotatable pointer, and said housing having a distance scale thereon traversed by said pointer.

References Cited in the file of this patent

UNITED STATES PATENTS

| | | |
|---|---|---|
| 881,127 | Jacob | Mar. 10, 1908 |
| 889,625 | Konig et al. | June 2, 1908 |
| 2,213,605 | Mathieu | Sept. 3, 1940 |